P. S. WHITING.
TIRE RIM PROTECTOR.
APPLICATION FILED APR. 19, 1919.
1,411,544.
Patented Apr. 4, 1922.
3 SHEETS—SHEET 3.
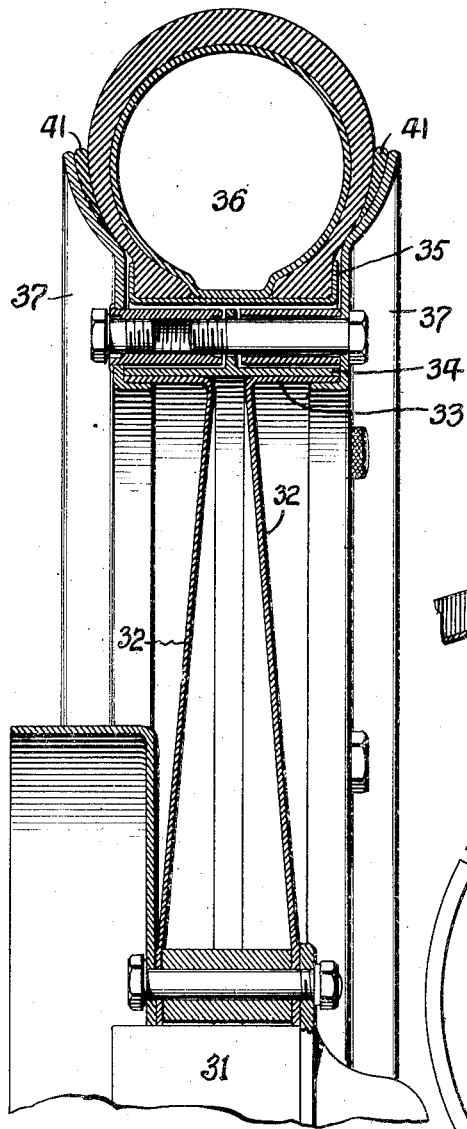
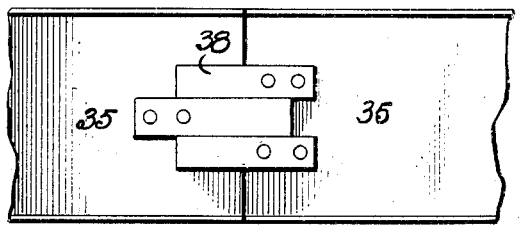
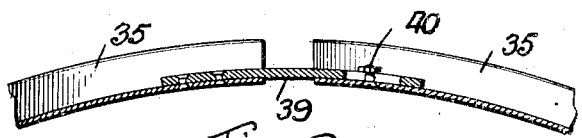
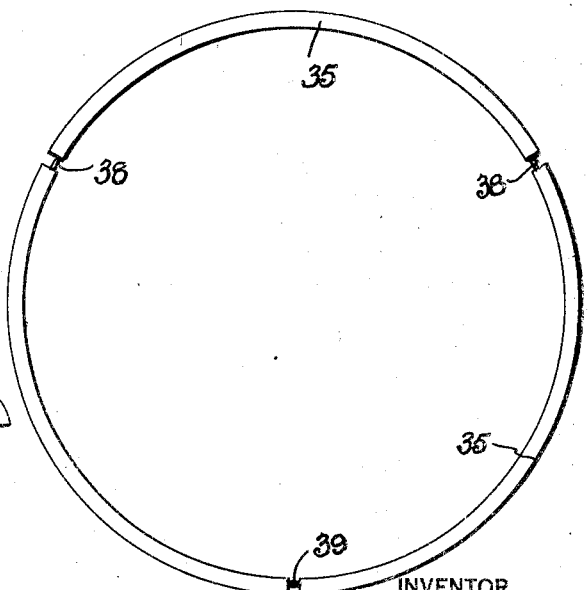
INVENTOR
Phineas S. Whiting.
By
ATTORNEYS

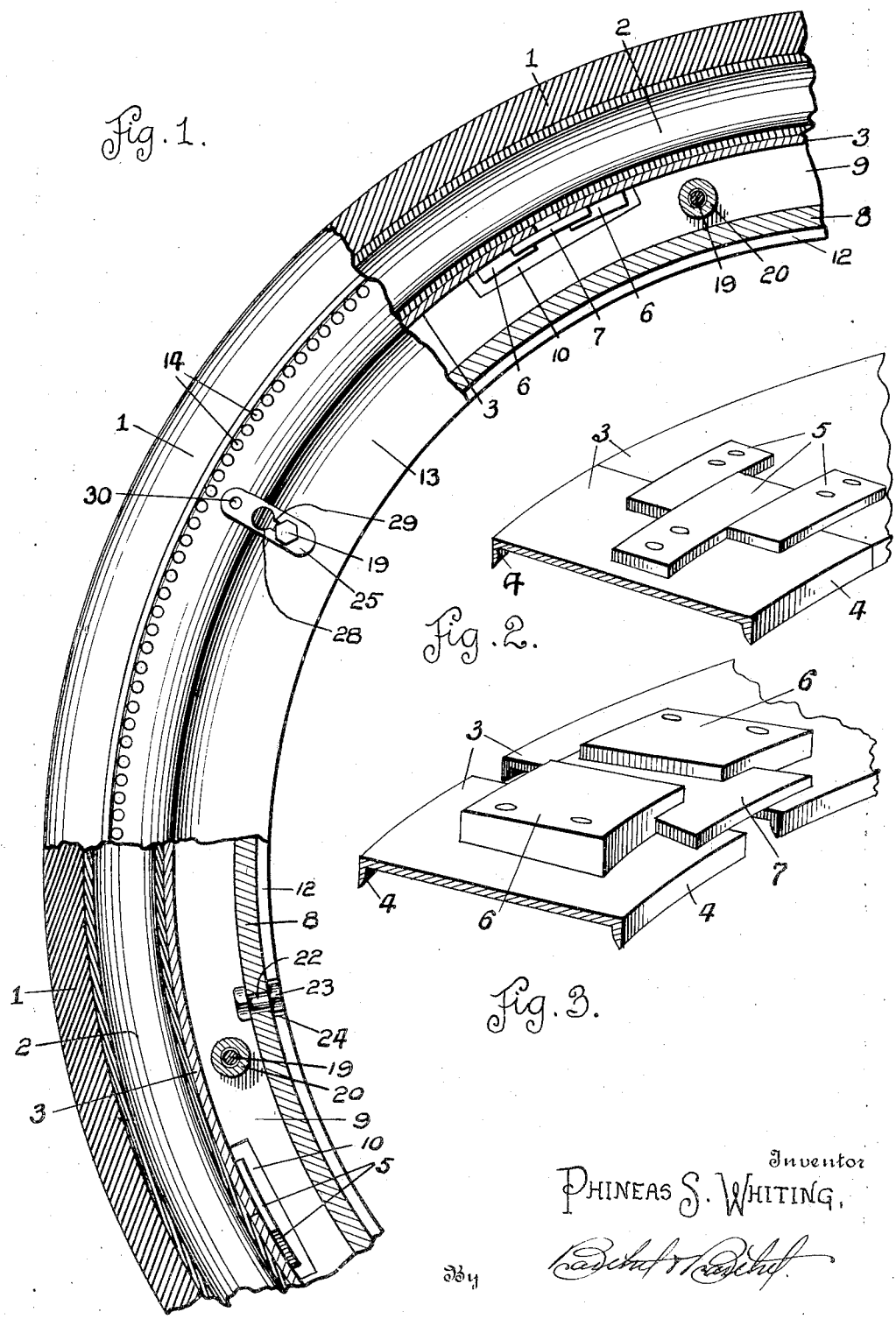

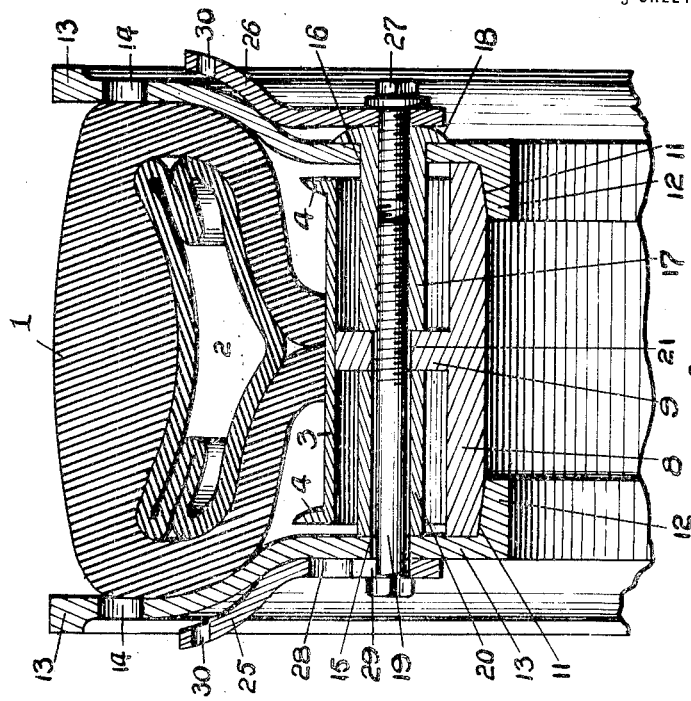
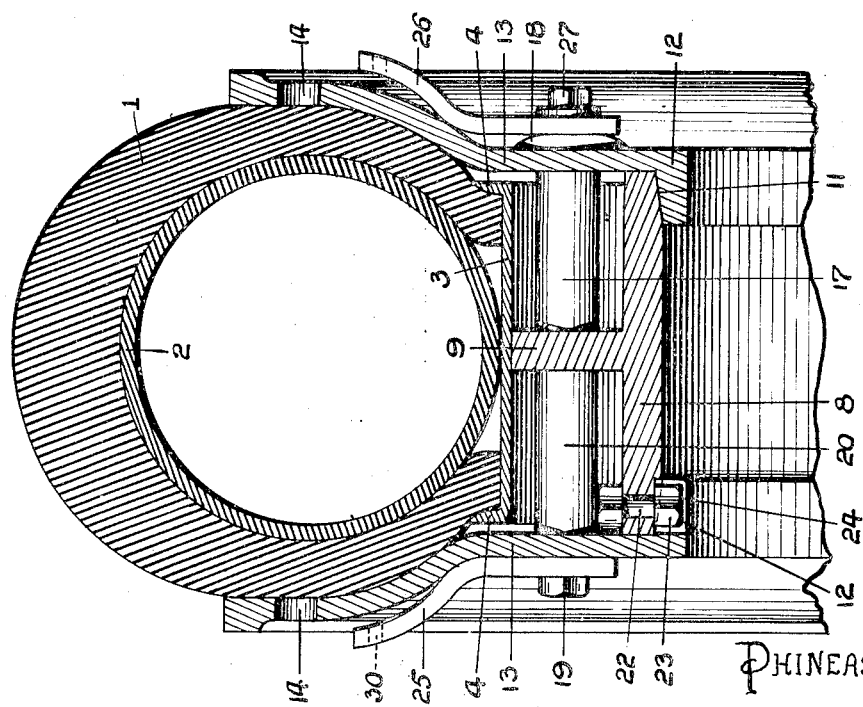

UNITED STATES PATENT OFFICE.

PHINEAS S. WHITING, OF DETROIT, MICHIGAN.

TIRE-RIM PROTECTOR.

1,411,544.  Specification of Letters Patent.  Patented Apr. 4, 1922.

Application filed April 19, 1919. Serial No. 291,198.

*To all whom it may concern:*

Be it known that I, PHINEAS S. WHITING, a citizen of the United States of America, residing at Detroit, in the county of Wayne and State of Michigan, have invented certain new and useful Improvements in Tire-Rim Protectors, of which the following is a specification, reference being had therein to the accompanying drawings.

The object of my invention is to provide novel rims and tire protecting side plates, the rims serving as holding means for an inflated pneumatic tire and the side plates for protecting the tire when deflated, thus permitting of a vehicle being operated without the tire being cut and injured and without the rim or felly member of a wheel being fractured or broken. In other words, an automobile, truck or similar vehicle disabled due to tire punctures, blow-outs, or other tire troubles may safely reach a repair station or home. The rims have been designed so as to be used on an automobile wheel possessing the "quick-detachable" and "demountable" features, and also that antiskidding devices, as tread chain may be used.

The rims will be hereinafter described and then claimed, and reference will now be had to the drawings, wherein—

Figure 1 is a side elevation of a portion of a tire, partly broken away and partly in section, showing the tire supported by a removable rim and side plates in accordance with my invention;

Figs. 2 and 3 are perspective views of a portion of a sectional removable rim, illustrating the manner of interlocking or articulating the sections of the holder;

Fig. 4 is a cross sectional view of the tire and its rim;

Fig. 5 is a similar view showing the tire deflated and protected by side plates;

Fig. 6 is a cross sectional view of a modified form of rim;

Fig. 7 is a plan of a portion of a removable rim;

Fig. 8 is a longitudinal sectional view of the same, and

Fig. 9 is an elevation, on a small scale, of the sectional removable rim.

In the drawings, the reference numeral 1 denotes an outer casing adapted to be held in a distended and useful position by an inner inflated pneumatic tube 2, said outer casing being maintained about the inner tube 2 by a sectional channel removable rim 3, which has side flanges 4 engaging the annular edges of the outer casing 1, as best shown in Fig. 4. The removable rim 3 is preferably made of three or more sections and some of said sections have the confronting ends thereof provided with cleats 5 adapted to interlock as shown in Fig. 2, and prevent lateral displacement of one section of the rim relative to the other section. Two of the rim sections will have the confronting edges thereof provided with wedge or key holders 6 for a wedge or tapering key 7 which may be driven between the holders 6 to expand or distend all of the sections of the rim 3. With the sections of the rim 3 assembled the annular flanges 4 of the holder sections will maintain the edges of the outer casing 1 on said rim and the outer casing about the inner tube 2, and with the tire in this condition it can be readily installed or carried as a spare tire.

8 denotes an annular member or fixed rim which in cross section is substantially inverted T shape, said fixed rim having a central peripheral rib 9 on which is placed the sectional removable rim 3, said rib being cut away, as at 10, to provide clearance for the cleats 5, key holders 6, or coupling means between the sections of the rim 3. The rib 9 maintains the fixed rim 8 in spaced relation to the rim 3, and the side edges of said fixed rim are tapered or beveled, as at 11, to accommodate the inwardly extending annular flanges 12 of said side plates 13. With the inner wall of the fixed rim 8 beveled or tapered it is possible to force the side plates 13 inwardly until the same contacts with the side edges of the fixed rim 8. The outer edges of the plates 13 are shaped to engage the outer casing 1 and cooperate in holding the outer casing on the sectional holder 3 and said sectional removable rim on the rib 9 of the fixed rim 8. The outer edges of the plates 13 are therefore slightly curved, as best shown in Figs. 4 and 5 and said plates may be provided with a series of apertures or openings 14 to reduce the weight of the same. The sides of the plates are also provided with a plurality of equally spaced openings 15 and 16, the latter providing clearance for long sleeve nuts 17 having heads 18, said sleeve nuts extending through the openings 16 and abutting the annular rib 9 of the fixed rim 8.

The openings 15 provide clearance for long screw bolts 19 and these screw bolts extend through sleeves 20 placed between the annular rib 9 and one of the side plates 13. The long screw bolts 19 extend through openings 21 provided therefor in the rib 9 and said screw bolts are held by the sleeve nuts 17. It is therefore possible for the screw bolts 19 to anchor the sleeves 20, sleeve nuts 17 and side plates 13 relative to the fixed rim 8, and in practice, it is preferable to have the screw bolts 19 at the outer side of a wheel.

To prevent the side plates 13 from shifting circumferentially of the fixed rim 8, said fixed rim has a holdfast device extending into one of the flanges 12 and said hold fast device may be in the form of a bolt 22 and a nut 23, said nut extending into a slot or recess 24 provided therefor in the flange 12.

Since it may be desirable to use tread chains or anti-skidding devices in connection with the tire, suitable provision has been made for holding chains or similar devices. To this end, clips 25 and 26 are employed, the clips 26 being held by short screw bolts 27 screwed into sleeve nuts 17. The clips 25 have openings 28 to provide clearance for the heads of the long screw bolts 19 and communicating with the openings 28 are slots 29 to receive the shanks of the screw bolts 19. It is therefore possible to easily connect the clips 26 to the sleeve nuts 17 and by loosening the screw bolts 19, the clips 25 can be placed over the heads of said screw bolts, and then shifted outwardly so that the clips will be held behind the heads of said bolts. With the screw bolts 19 and 27 tightened the clips 25 and 26 will be held in engagement with the side plates 13. The outer ends of the clips 25 and 26 are bent outwardly in spaced relation to the plates 13, and apertured as at 30, so as to permit of chains or similar devices being easily connected to said clips to extend over the tread of the outer casing 1.

By reference to Fig. 5, it will be noted that the side plates 13 center or correctly position the tire relative to the fixed rim 8 there being a small space between the flanges 4 of the removable rim 3 and the side plates that permit of a slight lateral movement of the removable rim 3 on the rib 9 of the fixed rim 8. Now, should the inner tube 2 be deflated from some cause or other and the outer casing 1 collapsed, the side plates 13 will provide tread members for safely supporting the wheel. The inner tube 2 and the outer casing 1 when collapsed, may assume various positions between the side plates 13, one of such positions being shown in Fig. 5, where the edges of the outer casing 1 have shifted inwardly thus withdrawing the tread of the outer casing to a position between the sides of the plates, where said outer casing is protected against rim cut and other injury that might be incurred if the wheel traveled on the deflated tire.

In connection with a wire spoke wheel, my invention possesses a distinct advantage. It is a well known fact that a wire spoke wheel, due to a load, will more or less become elliptical. It may be only for the thousandths part of an inch but during the rolling action such distortion of a wheel reduces the life of the same. With my side plates connected to the fixed rim of a wire spoke wheel the inwardly projecting and truly concentric flange 12 will positively support the fixed rim of a wire spoke wheel, preventing it from assuming elliptical form under a load, and this is true either with the wheel stationary or in operation. It is therefore apparent that the life of a wire spoke wheel is materially prolonged and consequently a safety factor added thereto.

My invention possesses another characteristic in the sectional removable rim 3. This is positively held or "froze" on the peripheral rib 9 by the internal pressure of the tire, if the tire is inflated to such an extent. It is therefore possible to positively anchor the removable rim on the rib 9 and thereby have said removable rim cooperating with the side plates in safely retaining the tire in place. To remove the tire it may be necessary to reduce the pressure of air in the tire, so as to loosen the removable rim 3 relative to the rib 9. This all depends on the pressure of air in the tire. Furthermore, the side plates provide rigid and solid guards at the sides of the tire where the same is liable to be weakened by curb cuts and abrasions. It is therefore not only possible to increase the aggregate mileage of the tire, but to permit of a heavy vehicle being operated after a tire has failed. This is very important in the transportation of army supplies or men, since many vehicles have, due to tire trouble, delayed progress, whereas if equipped with my improvement such vehicles could continue to the end of the route.

In Figs. 6 to 9 inclusive, there is illustrated a slight modification of my invention as applied to the disc of a vehicle wheel, the wheel including a hub 31, and disc 32 connected to said hub and provided with peripheral flanges 33. On the peripheral flanges 33 is a fixed rim 34 somewhat similar to the fixed rim 8 and surrounding the member 34 is a sectional removable rim 35. The sectional removable rim supports a tire 36 and the tire is retained on the removable rim by side plates 37 similar to the side plates 13.

In the previously described form of my invention the sectional removable rim had its fastening means on the inner wall thereof necessitating cutting away the rib of the fixed rim 34, whereas in the present form of my invention, I locate the fastening means in the removable rim, that is, on its outer wall, as best shown in Figs. 7 and 8. Two of the fasteners are in the form of cleats 38, and the other fastener is in the form of a cleat 39 fixed to one of the rim sections and adjustably connected to the adjoining rim sections as at 40. By locating the holder fasteners on the outer wall thereof it is unnecessary to cut away the rib of the channel member 34.

By reference to Fig. 6, it will be observed that the side plates 37 clamp the peripheral disc flanges 33 against the fixed rim 34, thus providing a very rigid wheel construction.

In both forms of my invention I prefer to use liners between the side plates 37 and the side walls of the outer tire casing, but have only shown these liners in Fig. 6 where the same are designated 41. After operating a vehicle equipped with wheels in accordance with my invention, I found that the side plates had a tendency to bite into the sides of the outer tire casing causing injury in the outer casing which can be prevented by installing the liners 41. The liners 41 can be made of a more durable material than the outer tire casing and it is a very easy matter to install the liners when assembling the parts of the tire.

Since my improvement may be used in connection with a wheel having wood or wire spokes and felly members of various types, the wheel proper has not been shown, and it is to be understood that the side plates may be used with or without the clips and with any type of pneumatic tire. This is also the case with the liners, which have not been shown in all of the views of the drawings, but will be used whenever a poor quality of tire is encountered or a good tire shows wear at its side.

What I claim is:—

1. The combination with a wheel tire, of a removable rim supporting the edges of said tire, a fixed rim in said removable rim, and side plates connected to the sides of said fixed rim and bracing the sides of said tire, said side plates constituting tread members when said tire is deflated, and upon which the wheel may travel independent of said tire.

2. The combination with a tire, of a sectional removable rim for said tire, a fixed rim supporting said removable rim, side plates at the sides of said fixed rim and bracing said tire and adapted to provide tread members having the edges thereof free of said tire when deflated, and means connecting said side plates to said fixed rim.

3. The combination with a tire, of a fixed rim having a rib, a removable rim on the rib of said fixed rim and adapted for holding said tire, plates at the sides of said fixed rim and providing tread members when said tire is deflated, and means extending through the rib of said fixed rim adapted for holding said plates relative thereto.

4. The combination with a tire, of a fixed rim having a rib, a removable rim on the rib of said fixed rim adapted for supporting said tire, plates at the sides of said fixed rim bracing the sides of said tire and adapted to provide tread members when said tire is deflated, and means including sleeves, sleeve nuts, and bolts adapted for holding said plates relative to said fixed rim.

5. The combination with a tire, of a fixed rim, a removable rim about said fixed rim and adapted for supporting said tire, plates at the sides of said fixed rim adapted to provide tread members when said tire is deflated, means between said fixed rim and said removable rim adapted for retaining the plates in engagement with said fixed rim, and clips held in place against said plates by said means.

6. The combination with a tire, of a fixed rim having a rib, a removable rim about the rib of said fixed rim adapted for supporting said tire, plates at the sides of said fixed rim adapted to provide tread members when said tire is deflated, sleeve nuts at one side of the rib of said fixed rim, sleeves at the other side of the rib of said fixed rim, screw bolts extending through said sleeve into said sleeve nuts and adapted to cooperate with said sleeve nuts in holding said plates in engagement with said fixed rim.

In testimony whereof I affix my signature in the presence of two witnesses.

PHINEAS S. WHITING.

Witnesses:
THOMAS T. HOLLINGER,
ANNA M. DORR.